US010927769B2

(12) United States Patent
Ino et al.

(10) Patent No.: US 10,927,769 B2
(45) Date of Patent: Feb. 23, 2021

(54) ELECTRONICALLY CONTROLLED THROTTLE CONTROL DEVICE

(71) Applicant: NIKKI CO., LTD., Kanagawa-ken (JP)

(72) Inventors: Takuya Ino, Kanagawa-ken (JP); Ryuichi Oguro, Kanagawa-ken (JP)

(73) Assignee: NIKKI CO., LTD

(*) Notice: Subject to any disclaimer, the term of this patent is extended or adjusted under 35 U.S.C. 154(b) by 0 days.

(21) Appl. No.: 16/814,973

(22) Filed: Mar. 10, 2020

(65) Prior Publication Data

US 2020/0291873 A1 Sep. 17, 2020

(30) Foreign Application Priority Data

Mar. 11, 2019 (JP) .............................. JP2019-043601

(51) Int. Cl.
*F02D 9/02* (2006.01)
*F02D 41/04* (2006.01)
*F02D 41/14* (2006.01)

(52) U.S. Cl.
CPC ............. *F02D 9/02* (2013.01); *F02D 41/045* (2013.01); *F02D 41/1401* (2013.01); *F02D 2009/0271* (2013.01); *F02D 2041/1409* (2013.01); *F02D 2200/0404* (2013.01)

(58) Field of Classification Search
CPC .... F02D 41/045; F02D 11/10; F02D 41/1401; F02D 9/02; F02D 2041/1409; F02D 2200/0404; F02D 2009/0271; F02D 2041/1422; F02D 11/106
See application file for complete search history.

(56) References Cited

U.S. PATENT DOCUMENTS

| 5,151,861 | A | * | 9/1992 | Danno | B60K 28/16 123/336 |
| 5,193,509 | A | * | 3/1993 | Ohmori | F02D 41/045 123/493 |
| 5,508,923 | A | * | 4/1996 | Ibamoto | F02D 11/105 701/70 |
| 6,935,308 | B1 | * | 8/2005 | Nakamoto | F02D 11/105 123/395 |
| 2003/0094157 | A1 | * | 5/2003 | Tachibana | F02D 11/107 123/406.13 |

(Continued)

FOREIGN PATENT DOCUMENTS

| JP | H05-240073 A | 9/1993 |
| JP | 2008-038872 A | 2/2008 |

OTHER PUBLICATIONS

English abstract for JP-2008-038872.

*Primary Examiner* — Sizo B Vilakazi
(74) *Attorney, Agent, or Firm* — Fishman Stewart PLLC

(57) ABSTRACT

In an electronically controlled throttle control device in which a throttle control output command calculated by an electronic control unit (ECU) is calculated based on a throttle main control command, calculated from a throttle opening deviation which is a difference between a throttle opening command and a throttle opening detection signal, and a throttle correction control command which is a value obtained by integrating a product of the throttle opening deviation and a coefficient, the coefficient for calculation of the throttle correction control command is changed depending on a driving state based on an acceleration state and a deceleration state of a throttle and a small throttle deviation state.

2 Claims, 2 Drawing Sheets

(56) References Cited

U.S. PATENT DOCUMENTS

| | | | | |
|---|---|---|---|---|
| 2004/0003804 A1* | 1/2004 | Yasui | .................. | F02D 41/1458 |
| | | | | 123/673 |
| 2005/0274355 A1* | 12/2005 | Watanabe | ............. | F02D 11/105 |
| | | | | 123/339.22 |
| 2012/0059568 A1* | 3/2012 | Matsumoto | ........... | F02D 41/045 |
| | | | | 701/104 |
| 2012/0060793 A1* | 3/2012 | Kim | ................... | F02D 41/3836 |
| | | | | 123/299 |
| 2012/0065869 A1* | 3/2012 | Kim | ..................... | F02D 41/045 |
| | | | | 701/104 |

* cited by examiner

ELECTRONICALLY CONTROLLED THROTTLE CONTROL DEVICE

CROSS REFERENCE TO RELATED APPLICATION

This application claims priority to Japanese Patent Application No. 2019-043601, filed on Mar. 11, 2019, the contents of which are hereby incorporated by reference in its entirety.

BACKGROUND

Technical Field

The present invention relates to an electronically controlled throttle control device that opens and closes a throttle installed in an intake system of a vehicle engine by an electronic control system.

Background

The present invention aims to improve the fuel efficiency and traveling performance of a vehicle. Electronically controlled throttle control devices that electronically open and close a throttle using an electronic control system, instead of opening and closing the throttle mechanically by driver's accelerator operation have become widespread in order to perform engine control with high accuracy, and examples are described in JP H5-240073 A and JP 2008-38872 A.

As illustrated in FIG. 1, such an electronically controlled throttle control device includes: a throttle opening sensor 2 configured to detect an opening of a throttle valve 1 as a throttle opening signal; an electronic control unit (ECU) 5 configured to calculate a throttle opening command signal in response to an operation status of a vehicle and calculate a control output command signal for opening and closing the throttle valve 1 provided in an intake conduit 4 of a throttle body 3 to a target opening position based on the throttle opening command and the throttle opening signal; and an actuator 6 configured to open and close the throttle valve 1 by a control output command signal output from the electronic control unit (ECU) 5. As illustrated in FIG. 4, the control output command signal calculated by the electronic control unit (ECU) is calculated based on a throttle main control command, calculated from a throttle opening deviation which is a difference between the throttle opening command and the throttle opening signal, and a throttle correction control command which is a value obtained by integrating a product of the throttle opening deviation and a coefficient.

However, the above-described conventional electronically controlled throttle control device calculates the integral during the entire period in which the throttle valve is driven so that excessive throttle correction control command is caused by the influence of a large throttle opening deviation.

Therefore, there is a problem that the throttle easily overshoots with respect to the throttle opening command as illustrated in FIG. 5. In addition, there is also a problem that the convergence time of the throttle opening increases due to the occurrence of overshoot.

SUMMARY

The present invention has been made by focusing on the problems of the conventional electronically controlled throttle control device, and an object thereof is not only to prevent overshooting of a throttle with respect to a throttle opening command but also to shorten the convergence time of throttle opening.

An electronically controlled throttle control device according to the present invention, made to solve the above-described problems, include: a throttle opening sensor configured to detect an opening of a throttle valve as a throttle opening signal; an electronic control unit (ECU) configured to calculate a throttle opening command in response to an operation status of a vehicle and calculate a control output command for opening and closing the throttle valve provided in an intake conduit of a throttle body to a target opening position based on the throttle opening command and the throttle opening signal; and an actuator configured to open and close the throttle valve by a control output command signal output from the electronic control unit (ECU), the control output command calculated by the electronic control unit (ECU) being calculated based on a throttle main control command, calculated from a throttle opening deviation which is a difference between the throttle opening command and the throttle opening signal, and a throttle correction control command which is a value obtained by integrating a product of the throttle opening deviation and a coefficient. In the electronically-controlled throttle control device, the coefficient for calculation of the throttle correction control command is changed depending on a driving state based on an acceleration state and a deceleration state of the throttle and a small throttle opening deviation state.

In addition, in the present invention, it is preferable that the coefficient for calculation of the throttle correction control command be changed depending on a driving state of the throttle by setting a case where the throttle opening deviation and the throttle main control command are both positive and a case where the throttle opening deviation and the throttle main control command are both negative as the acceleration state, other cases as the deceleration state, and a case where the throttle opening deviation is equal to or smaller than a certain value as the small throttle opening deviation state.

According to the present invention, it is possible to not only prevent overshooting of the throttle with respect to the throttle opening command but also to shorten the convergence time of the throttle opening.

DETAILED DESCRIPTION

Hereinafter, an embodiment for carrying out the present invention will be described with reference to the drawings.

Figure 1:
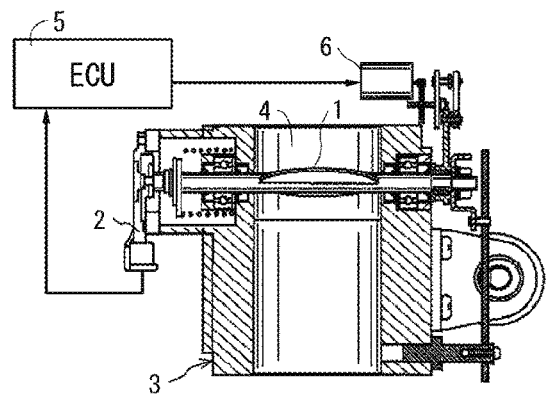
FIG. 1 is a schematic diagram illustrating a configuration of an electronically controlled throttle control device according to a preferred embodiment of the present invention and a conventional example.
Figure 2:
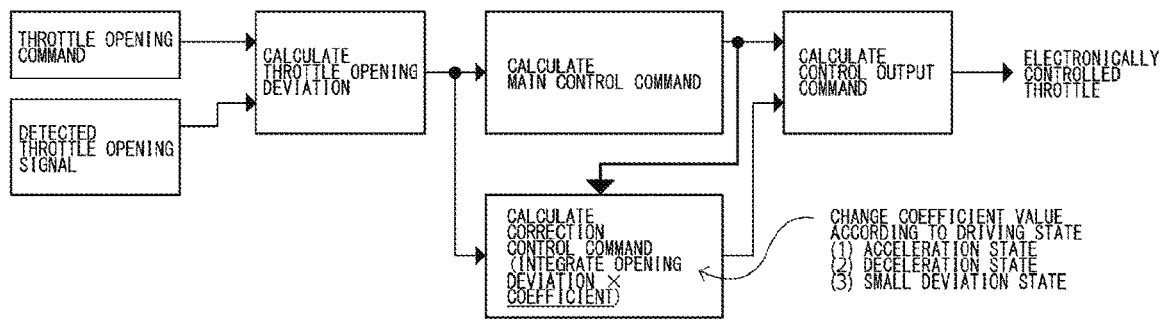
FIG. 2 is a block diagram illustrating a control output command signal calculation unit according to the embodiment illustrated in FIG. 1.

FIG. 1 illustrates a preferred embodiment of an electronically controlled throttle control device according to the present invention, and the overall is substantially the same as that of a conventional example. The electronically controlled throttle control device is similar to the conventional example in terms of including a throttle opening sensor 2 configured to detect an opening of a throttle valve 1 as a throttle opening signal; an electronic control unit (ECU) 5 configured to calculate a throttle opening command signal in response to an operation status of a vehicle and calculate a control output command signal for opening and closing the throttle valve 1 provided in an intake conduit 4 of a throttle body 3 to a target opening position based on the throttle opening command and the throttle opening signal; and an actuator 6 configured to open and close the throttle by a control output command signal output from the electronic control unit (ECU) 5, and the control output command calculated by the electronic control unit (ECU) being calculated based on a throttle main control command, calculated from a throttle opening deviation which is a difference between the throttle opening command and the throttle opening signal, and a throttle correction control command which is a value obtained by integrating a product of the throttle opening deviation and a coefficient as illustrated in FIG. 2.

Figure 4:
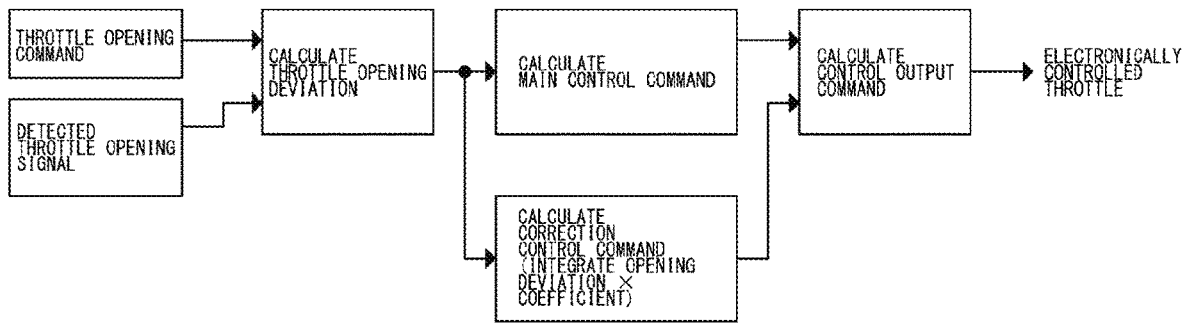
FIG. 4 is a block diagram illustrating a control output command signal calculation unit according to the conventional example illustrated in FIG. 1.
Figure 5:
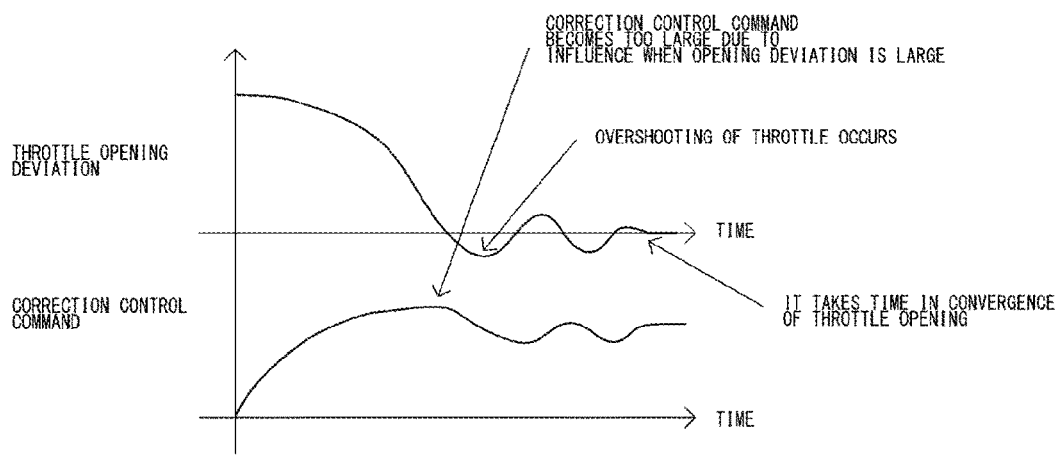
FIG. 5 is a relationship diagram illustrating temporal changes of a throttle opening deviation and a correction control command according to the conventional example illustrated in FIG. 1.

In particular, a difference from FIG. 4 according to the conventional example is that a value of the coefficient used at the time of calculating the throttle correction control command is changed depending on a driving state of the throttle. Specifically, the throttle driving state is set such that a case where the throttle opening deviation is positive and a throttle main control command value is positive or a case where the throttle opening deviation is negative and the throttle main control command value is negative is set as a throttle acceleration state is set, and other cases are set as a throttle deceleration state. In addition, a case where the throttle opening approaches the opening command and the opening deviation becomes equal to or smaller than a certain value is set as a small deviation state.

Further, the value of the coefficient used at the time of performing the integral calculation is set depending on the three states such that the coefficient is set to be small in the acceleration state, to a medium value in the deceleration state, and to be large in the small deviation state, and the throttle correction control command is obtained. The control output command signal is calculated from the obtained main control command and the correction control command in consideration of the throttle driving state, and the throttle is driven.

Figure 3:
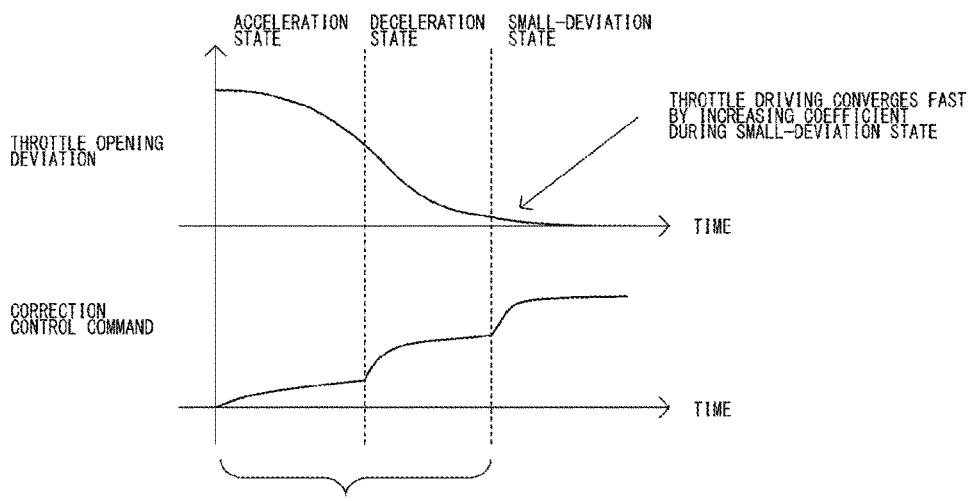
FIG. 3 is a relationship diagram illustrating temporal changes of a throttle opening deviation and a correction control command according to the embodiment illustrated in FIG. 1.

As a result, it is possible to reduce the influence on the correction control command when the opening deviation is large by changing the coefficient at the time of integrating the throttle opening deviation and a temporal change of the correction control command in the throttle driving state as illustrated in FIG. 3. Accordingly, the correction control command is not excessively generated, and thus, the throttle is less likely to overshoot. In addition, the opening deviation can be made quickly approach the opening instruction when the opening deviation becomes small, and thus, the convergence time of the throttle opening is shortened.

What is claimed is:

1. An electronically controlled throttle control device comprising: a throttle opening sensor configured to detect an opening of a throttle valve as a throttle opening signal; an electronic control unit (ECU) configured to calculate a throttle opening command in response to an operation status of a vehicle and calculate a control output command for opening and closing the throttle valve provided in an intake conduit of a throttle body to a target opening position based on the throttle opening command and the throttle opening signal; and an actuator configured to open and close the throttle valve by a control output command signal output from the electronic control unit (ECU), the control output command calculated by the electronic control unit (ECU) being calculated based on a throttle main control command, calculated from a throttle opening deviation which is a difference between the throttle opening command and the throttle opening signal, and a throttle correction control command which is a value obtained by integrating a product of the throttle opening deviation and a coefficient, wherein the coefficient for calculation of the throttle correction control command is changed depending on a driving state based on an acceleration state and a deceleration state of the throttle and a small throttle opening deviation state.

2. The electronically controlled throttle control device according to claim 1, wherein the coefficient for calculation of the throttle correction control command is changed depending on a driving state of the throttle valve by setting a case where the throttle opening deviation and the throttle main control command are both positive and a case where the throttle opening deviation and the throttle main control command are both negative as the acceleration state, other cases as the deceleration state, and a case where the throttle opening deviation falls below a certain value as the small opening deviation state.

\* \* \* \* \*